(12) United States Patent
Yu

(10) Patent No.: US 11,806,200 B2
(45) Date of Patent: Nov. 7, 2023

(54) PORTABLE ORAL IRRIGATOR

(71) Applicant: Lei Yu, Guangdong (CN)

(72) Inventor: Lei Yu, Guangdong (CN)

(73) Assignee: Yuxingyuan Shenzhen Electronic Technology Co., Ltd., Shenzhen (CN)

( * ) Notice: Subject to any disclaimer, the term of this patent is extended or adjusted under 35 U.S.C. 154(b) by 580 days.

(21) Appl. No.: 17/095,780

(22) Filed: Nov. 12, 2020

(65) Prior Publication Data

US 2021/0059785 A1 Mar. 4, 2021

(51) Int. Cl.
*A61C 1/00* (2006.01)
*A61C 1/08* (2006.01)
*A61C 17/02* (2006.01)

(52) U.S. Cl.
CPC .......... *A61C 1/0053* (2013.01); *A61C 1/0015* (2013.01); *A61C 1/0092* (2013.01); *A61C 1/088* (2013.01); *A61C 17/0202* (2013.01)

(58) Field of Classification Search
CPC ... A61C 1/0053; A61C 1/0015; A61C 1/0092; A61C 1/088; A61C 17/0202; A61C 17/02; A61C 17/024; A61C 17/028; A61C 17/0205; A61C 17/0211; A61C 17/36; A61C 17/224; A61C 17/225; A61C 17/227; A61C 15/04
See application file for complete search history.

(56) References Cited

U.S. PATENT DOCUMENTS

| 2009/0070949 | A1* | 3/2009 | Sagel | A46B 11/0058 15/28 |
| 2014/0259474 | A1* | 9/2014 | Sokol | A61C 17/0202 15/22.2 |
| 2015/0182319 | A1* | 7/2015 | Wagner | A61C 17/20 132/308 |
| 2016/0151133 | A1* | 6/2016 | Luettgen | F04B 23/02 433/80 |
| 2020/0205949 | A1* | 7/2020 | Wood | A46B 11/001 |

* cited by examiner

*Primary Examiner* — Quang D Thanh

(57) ABSTRACT

A portable oral irrigator includes a charging seat assembly, a water container assembly, a housing assembly and a pump assembly. The charging seat assembly includes a charging seat base, a transparent charging seat member on the charging seat base, a first control board in the charging seat base, a first light guide line in the transparent charging seat member, a second light guide line in the charging seat base, a charging seat cover on the transparent charging seat member, and a charging socket projecting out of the charging seat cover. With provision of the charging seat assembly, the water container assembly, the housing assembly and the pump assembly, the pump unit draws water from the water container body and exits the water through the nozzle. The first and second light guide lines and the light guide strip emit light to indicate a current state of the oral irrigator.

10 Claims, 3 Drawing Sheets

PORTABLE ORAL IRRIGATOR

BACKGROUND OF THE INVENTION

1. Field of the Invention

The invention relates to oral irrigators and more particularly to a portable oral irrigator having improved characteristics.

2. Description of Related Art

Oral irrigator is invented in 1962 by a physician and an engineer both from Fort Collins, Colorado Tooth brushing is the most common practice for keeping oral hygiene. Dentists point out that a toothbrush is only capable of cleaning tooth enamel. For cleaning a gap between adjacent teeth, particularly the cleaning of the more important gums, other oral hygiene instruments are needed. Oral irrigators are new types of oral hygiene instrument. Oral irrigators are widely used by family members in both Europe and US. Now, oral irrigators are gaining popularity in China. Many people gradually like oral irrigators as oral hygiene instruments which are not only comfortable but also practical. Oral irrigators are commercially available in two types of variable-frequency and fixed-frequency. A user may select one based on need.

However, the conventional oral irrigators have the following disadvantages in use: In the known art, the oral irrigators are bulky and a user may have difficulties of holding it. It may bother the daily life of a user. It is uneasy to store, not visually attractive, and has a poor performance all due to the bulkiness.

Thus, the need for improvement still exists.

SUMMARY OF THE INVENTION

The invention has been made in an effort to solve the problems of the conventional art including bulkiness, being difficult of holding, bothering the daily life of a user, being not easy to store, being not visually attractive, and having poor performance by providing a portable oral irrigator having novel and nonobvious characteristics including being easy to hold and being visually attractive.

To achieve above objects including being easy to hold and being visually attractive and other objects of the invention, the invention provides a portable oral irrigator comprising a charging seat assembly including a charging seat base; a transparent charging seat member disposed on the charging seat base; a first control board disposed in the charging seat base; a first light guide line disposed in the transparent charging seat member; a second light guide line disposed in the charging seat base; a charging seat cover disposed on the transparent charging seat member; and a charging socket projecting out of the charging seat cover; a water container assembly including a water container body releasably disposed on the charging seat cover; a thin water container plate disposed on an outer surface of the water container body; a water container socket disposed in the thin water container plate and having a bottom releasably connected to a top of the charging socket; a water container face plate disposed on an outer surface of the thin water container plate; and an annular joining member disposed on a top of the water container body; a housing assembly including a housing body and a light guide strip both disposed on a top of the annular joining member; a second control board disposed in the housing body; a light guide line seat disposed at an output end of the second control board wherein the light guide strip has one end attached to the light guide line seat and the other end extending to inside of the housing body; a housing body face plate disposed on an outer surface of the housing body; and a nozzle disposed on a top of the housing body; and a pump assembly including a pump unit disposed in the housing body wherein the nozzle communicates with the water container body through the pump unit.

Preferably, further comprises a water container base disposed in a bottom of the water container body wherein a bottom of the water container base is releasably disposed on a top of the charging seat cover.

Preferably, further comprises an annular silicone seal releasably disposed on the light guide line seat, and a pressing piece disposed on a top of the light guide line seat.

Preferably, further comprises a nozzle catch disposed in the housing body, a compression spring disposed at one side of the nozzle catch, and a nozzle release button disposed at the other side of the nozzle catch.

Preferably, further comprises a cover seat disposed on a top of the housing body, a light guide member disposed on a top of the cover seat, a cover body disposed on a top of the light guide member, and a silicone seal disposed on a top of the cover body for securing the nozzle to the cover body.

Preferably, further comprises a mode selection button and an on/off switch from top to bottom in the housing body face plate, and a water inlet cap hingedly secured to the outer surface of the water container body.

Preferably, further comprises a power cord having one end connected to the first control board and the other end extending out of the first control board to dispose externally of the charging seat base, and a plurality of silicone rubber pads disposed on a bottom of the charging seat base.

Preferably, further comprises a plastic tube having one end attached to an input end of the pump unit wherein the plastic tube extends out of the pump unit to dispose in the water container body and has the other end formed as the filter connector.

Preferably, further comprises an air passable silicone seal disposed on a top of the water container body wherein an output end of the second control board is electrically connected to an input end of the light guide strip.

Preferably, the first control board and the second control board are electrically interconnected, and output ends of both the first light guide line and the second light guide line are electrically to an output end of the first control board.

The portable oral irrigator of the invention has the following advantageous effects in comparison with the prior art: With provision of the charging seat assembly, the water container assembly, the housing assembly and the pump assembly, the pump unit can draw water from the water container body and exit the water through the nozzle. The water container body can be easily held by the hand of a user. The first light guide line, the second light guide line, and the light guide strip can emit light to indicate a current state of the portable oral irrigator. The portable oral irrigator is visually attractive, has an increased performance and has wide applications.

The above and other objects, features and advantages of the invention will become apparent from the following detailed description taken with the accompanying drawings.

DETAILED DESCRIPTION OF THE INVENTION

Figure 1:
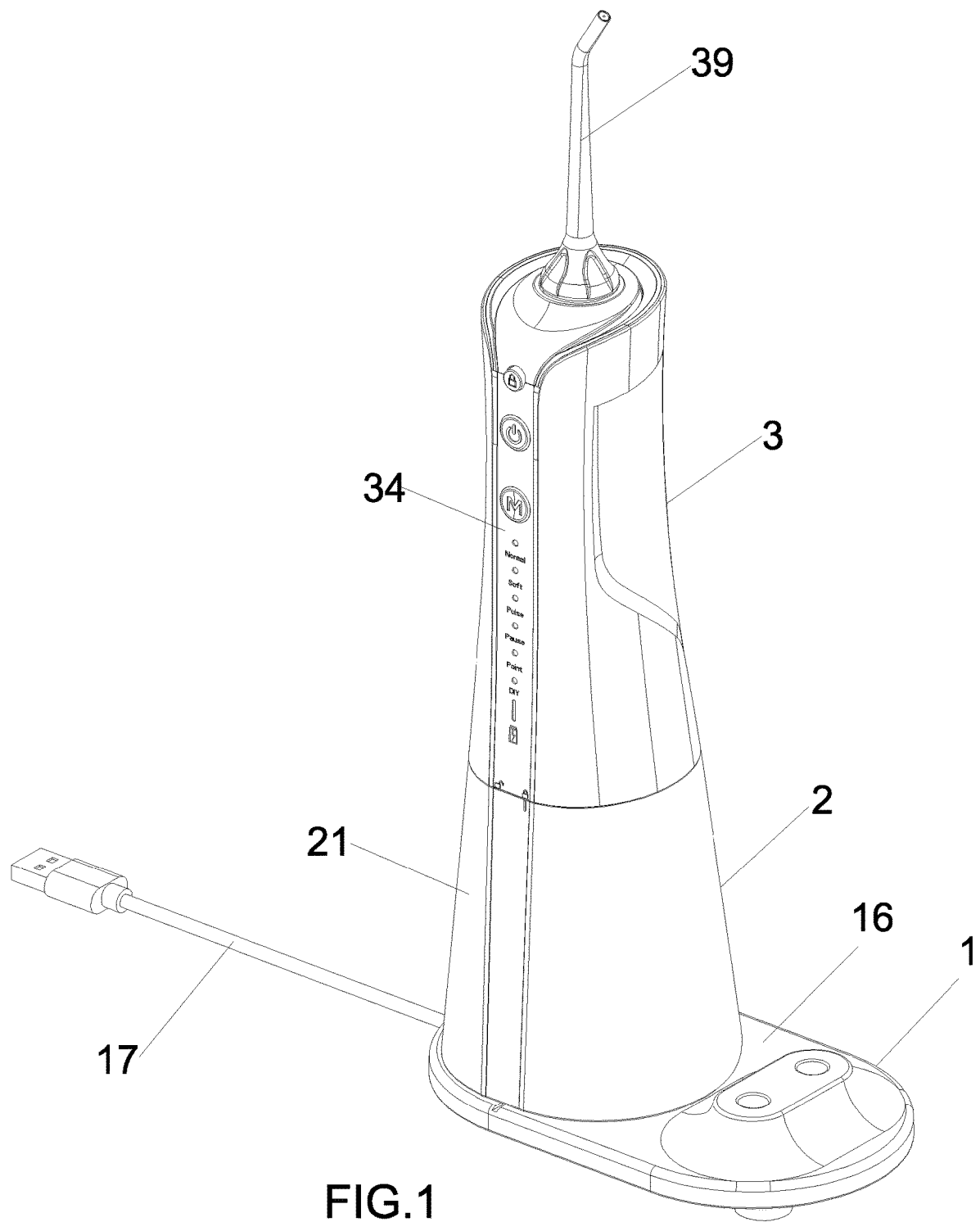
FIG. 1 is a perspective view of a portable oral irrigator according to the invention.

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail.

Figure 2:
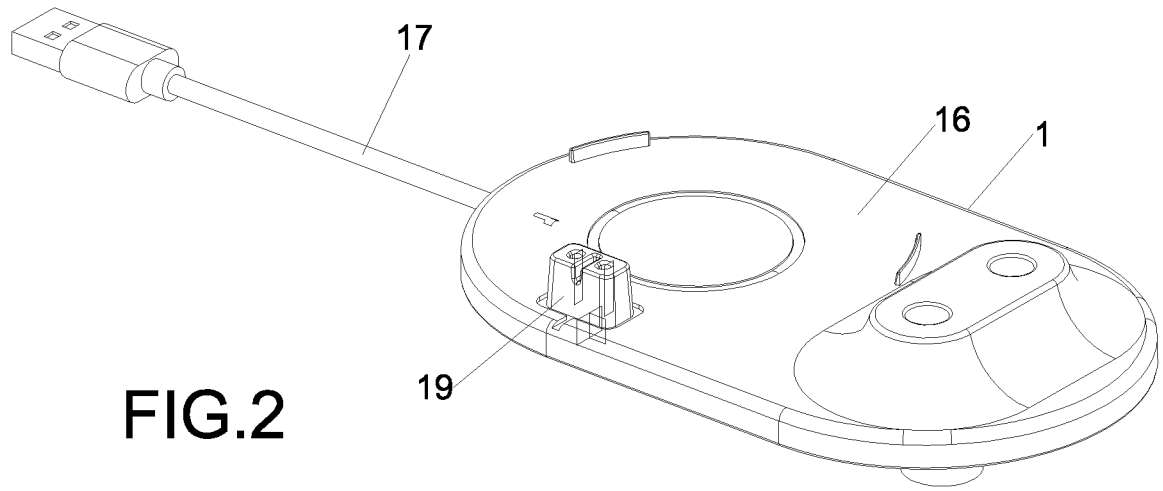
FIG. 2 is a perspective view of the charging seat assembly.
Figure 3:
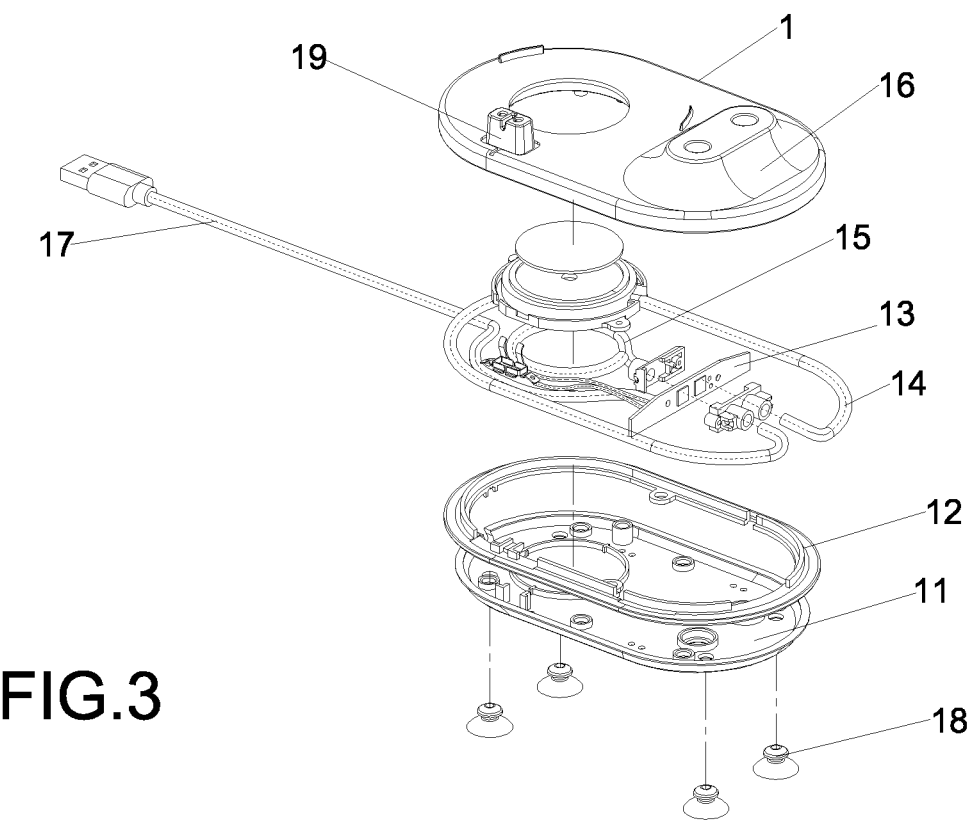
FIG. 3 is an exploded view of the charging seat assembly.
Figure 4:
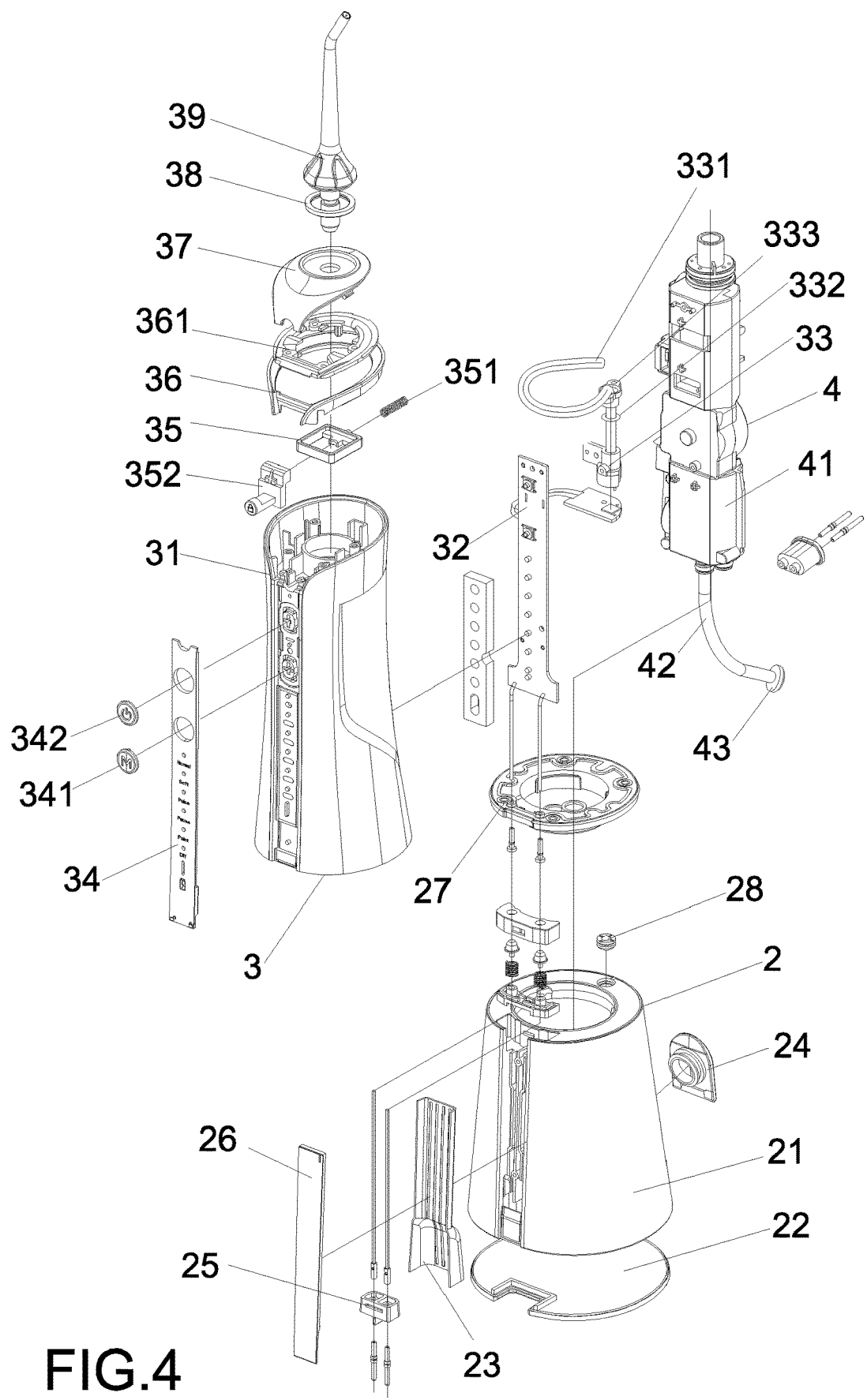
FIG. 4 is an exploded view of the water container assembly, the housing assembly and the pump assembly.

Referring to FIGS. 1 to 4, a portable oral irrigator in accordance with the invention comprises a charging seat assembly 1, a water container assembly 2, a housing assembly 3, and a pump assembly 4 as discussed in detail below.

The charging seat assembly 1 includes a charging seat base 11; a transparent charging seat member 12 disposed on the charging seat base 11; a first control board 13 disposed in the charging seat base 11; a first light guide line 14 disposed in the transparent charging seat member 12; a second light guide line 15 disposed in the charging seat base 11; a charging seat cover 16 disposed on the transparent charging seat member 12; and a charging socket 19 projecting out of the charging seat cover 16.

The water container assembly 2 includes a water container body 21 releasably disposed on the charging seat cover 16; a thin water container plate 23 disposed on an outer surface of the water container body 21; a water container socket 25 disposed in the thin water container plate 23 and having a bottom releasably connected to a top of the charging socket 19, and extending pins electrically connected to the charging socket 19; a water container face plate 26 disposed on an outer surface of the thin water container plate 23; and an annular joining member 27 disposed on a top of the water container body 21.

The housing assembly 3 includes a housing body 31 and a light guide strip 331 both disposed on a top of the annular joining member 27; a second control board 32 disposed in the housing body 31; a light guide line seat 33 disposed at an output end of the second control board 32 in which the light guide strip 331 has one end attached to the light guide line seat 33 and the other end extending to inside of the housing body 31; a housing body face plate 34 disposed on an outer surface of the housing body 31; and a nozzle 39 disposed on a top of the housing body 31.

The pump assembly 4 includes a pump unit 41 disposed in the housing body 31.

The pump unit 41 pumps water from the water container body 21 to the nozzle 38. A water container base 22 is disposed in a bottom of the water container body 21. A bottom of the water container base 22 is releasably disposed on a top of the charging seat cover 16. In case of slight leakage of the water container body 21, water flows through two intermediate grooves (four in total except line grooves at two sides respectively) of the water container body 21 to two drain holes of the water container socket 25 prior to exiting. When assembled with the charging seat assembly 1, water flows to a groove of the charging socket 19 on the charging seat cover 16 prior to exiting. Thus, the purpose of draining is obtained.

An annular silicone seal 332 is releasably disposed on the light guide line seat 33. A pressing piece 333 is disposed on a top of the light guide line seat 33. The light guide strip 331 is secured to the light guide line seat 22 at an output end of the second control board 32. The annular silicone seal 332 is disposed on a top of the housing body 31. The pressing piece 333 fastens the top to close using IPX7, thereby preventing leakage. The light guide strip 331 extends to shape a curve to dispose in the housing body 31, thereby carrying out the function of guiding light. A nozzle catch 35 is disposed in the housing body 31. A compression spring 351 is disposed at one side of the nozzle catch 35 and a nozzle release button 352 is disposed at the other side of the nozzle catch 35. A cover seat 36 is disposed on the top of the housing body 31. A light guide member 361 is disposed on a top of the cover seat 36. A cover body 37 is disposed on a top of the light guide member 361. A silicone seal 38 is disposed on a top of the cover body 37 and is used to secure the nozzle 39 to the cover body 37. In the housing body face plate 34, from top to bottom, there are disposed a mode selection button 341 and an on/off switch 342.

A water inlet cap 24 is hingedly secured to the outer surface of the water container body 21. A user may open the water inlet cap 24 prior to adding water to the water container body 21. The pump unit 41 can be activated to draw water from the water container body 21 and exiting the water through the nozzle 39 via a plastic tube 42 and a filter connector 43. A power cord 17 has one end connected to the first control board 13 and the other end extending out of the first control board 13 to dispose externally of the charging seat base 11. Four silicone rubber pads 18 are disposed on a bottom of the charging seat base 11 for stably disposing the portable oral irrigator and preventing the portable oral irrigator from sliding. One end of the plastic tube 42 is connected to an inlet of the pump unit 41. The plastic tube 42 extends out of the pump unit 41 to dispose in the water container body 21 and has the other end formed as the filter connector 43. An air passable silicone seal 28 is disposed on a top of the water container body 21. An output end of the second control board 32 is electrically connected to an input end of the light guide strip 331. The first control board 13 and the second control board 32 are electrically interconnected. Output ends of both the first light guide line 14 and the second light guide line 15 are electrically to the output end of the first control board 13. Within the housing body 31, there is further disposed a rechargeable battery electrically connected to the second control board 32. A user may press the mode selection button 341 to activate the first control board 13 or press the on/off switch 342 to activate the second control board 32. The power cord 17 is adapted to connect to an external electric power supply. When the portable oral irrigator is turned on, the first light guide line 14, the second light guide line 15, and the light guide strip 331 emit blue light. When the portable oral irrigator is charging, the first light guide line 14, the second light guide line 15, and the light guide strip 331 emit red light. When the portable oral irrigator has been fully charged, the first light guide line 14, the second light guide line 15, and the light guide strip 331 emits green light.

As discussed above, the portable oral irrigator has the following advantageous effects in comparison with the prior art: With provision of the charging seat assembly 1, the water container assembly 2, the housing assembly 3 and the pump assembly 4, the pump unit 41 can draw water from the water container body 21 and exit the water through the nozzle 39. The water container body 21 can be easily held by the hand of a user. The first light guide line 14, the second light guide line 15, and the light guide strip 331 can emit light to indicate a current state of the portable oral irrigator. The portable oral irrigator is visually attractive, has an increased performance and has wide applications.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof.

While the invention has been described in terms of preferred embodiments, those skilled in the art will recognize that the invention can be practiced with modifications within the spirit and scope of the appended claims.

What is claimed is:

1. A portable oral irrigator comprising:
   a charging seat assembly including a charging seat base; a transparent charging seat member disposed on the charging seat base; a first control board disposed in the charging seat base; a first light guide line disposed in the transparent charging seat member; a second light guide line disposed in the charging seat base; a charging seat cover disposed on the transparent charging seat member; and a charging socket projecting out of the charging seat cover;
   a water container assembly including a water container body releasably disposed on the charging seat cover; a thin water container plate disposed on an outer surface of the water container body; a water container socket disposed in the thin water container plate and having a bottom releasably connected to a top of the charging socket; a water container face plate disposed on an outer surface of the thin water container plate; and an annular joining member disposed on a top of the water container body;
   a housing assembly including a housing body and a light guide strip both disposed on a top of the annular joining member; a second control board disposed in the housing body; a light guide line seat disposed at an output end of the second control board wherein the light guide strip has one end attached to the light guide line seat and another end extending to inside of the housing body; a housing body face plate disposed on an outer surface of the housing body; and a nozzle disposed on a top of the housing body; and
   a pump assembly including a pump unit disposed in the housing body wherein the nozzle communicates with the water container body through the pump unit.

2. The portable oral irrigator of claim 1, further comprising a water container base disposed in a bottom of the water container body wherein a bottom of the water container base is releasably disposed on a top of the charging seat cover.

3. The portable oral irrigator of claim 1, further comprising an annular silicone seal releasably disposed on the light guide line seat, and a pressing piece disposed on a top of the light guide line seat.

4. The portable oral irrigator of claim 1, further comprising a nozzle catch disposed in the housing body, a compression spring disposed at one side of the nozzle catch, and a nozzle release button disposed at another side of the nozzle catch.

5. The portable oral irrigator of claim 1, further comprising a cover seat disposed on a top of the housing body, a light guide member disposed on a top of the cover seat, a cover body disposed on a top of the light guide member, and a silicone seal disposed on a top of the cover body for securing the nozzle to the cover body.

6. The portable oral irrigator of claim 1, further comprising a mode selection button and an on/off switch disposed respectively from bottom to top in the housing body face plate, and a water inlet cap hingedly secured to the outer surface of the water container body.

7. The portable oral irrigator of claim 1, further comprising a power cord having one end connected to the first control board and another end extending out of the first control board to dispose externally of the charging seat base, and a plurality of silicone rubber pads disposed on a bottom of the charging seat base.

8. The portable oral irrigator of claim 1, further comprising a plastic tube having one end attached to an input end of the pump unit wherein the plastic tube extends out of the pump unit to dispose in the water container body and has another end formed as a filter connector.

9. The portable oral irrigator of claim 1, further comprising an air passable silicone seal disposed on the top of the water container body wherein an output end of the second control board is electrically connected to an input end of the light guide strip.

10. The portable oral irrigator of claim 1, wherein the first control board and the second control board are electrically interconnected, and output ends of both the first light guide line and the second light guide line are electrically connected to an output end of the first control board.

* * * * *